(12) United States Patent
Levine et al.

(10) Patent No.: US 9,938,837 B2
(45) Date of Patent: Apr. 10, 2018

(54) GAS TURBINE ENGINE AIRFOIL TRAILING EDGE PASSAGE AND CORE FOR MAKING SAME

(71) Applicant: United Technologies Corporation, Hartford, CT (US)

(72) Inventors: Jeffrey R. Levine, Vernon Rockville, CT (US); Jeffrey S. Beattie, South Glastonbury, CT (US); Malcolm C. Staddon, Middlefield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 331 days.

(21) Appl. No.: 14/390,496

(22) PCT Filed: Mar. 12, 2013

(86) PCT No.: PCT/US2013/030332
§ 371 (c)(1),
(2) Date: Oct. 3, 2014

(87) PCT Pub. No.: WO2013/180792
PCT Pub. Date: Dec. 5, 2013

(65) Prior Publication Data
US 2015/0118064 A1 Apr. 30, 2015

Related U.S. Application Data

(63) Continuation of application No. 13/453,137, filed on Apr. 23, 2012, now Pat. No. 9,279,331.

(51) Int. Cl.
*F01D 5/18* (2006.01)
*B22C 9/10* (2006.01)

(52) U.S. Cl.
CPC .............. *F01D 5/188* (2013.01); *B22C 9/103* (2013.01); *B22C 9/108* (2013.01); *F01D 5/187* (2013.01);
(Continued)

(58) Field of Classification Search
CPC ......... F01D 5/188; F01D 5/187; B22C 9/103; B22C 9/108; F05D 2200/33;
(Continued)

(56) References Cited

U.S. PATENT DOCUMENTS 3,383,093 A * 5/1968 Howald .................. F01D 5/187
416/232
5,599,166 A 2/1997 Deptowicz et al.
(Continued)

FOREIGN PATENT DOCUMENTS

JP 11311102 11/1999

OTHER PUBLICATIONS

The Extended European Search Report for European Application No. 13796983.8, dated May 3, 2016.
(Continued)

*Primary Examiner* — Aaron R Eastman
(74) *Attorney, Agent, or Firm* — Carlson, Gaskey & Olds, P.C.

(57) ABSTRACT

An airfoil has a body that includes leading and trailing edges that adjoin pressure and suction sides to provide an exterior airfoil surface. A cooling passage extends in a radial direction from a root to a tip. A trailing edge cooling passage interconnects the cooling passage to the trailing edge. The trailing edge cooling passage includes first and second pedestals of different sizes that are arranged in a repeating pattern with respect to pedestals of the same size and with respect to pedestals of different sizes.

9 Claims, 7 Drawing Sheets

(52) U.S. Cl.
CPC .... *F05D 2200/33* (2013.01); *F05D 2230/211* (2013.01); *F05D 2260/22141* (2013.01); *F05D 2260/607* (2013.01); *F05D 2300/13* (2013.01); *Y02E 10/721* (2013.01)

(58) Field of Classification Search
CPC ..... F05D 2230/211; F05D 2260/22141; F05D 2260/607; F05D 2300/13
See application file for complete search history.

(56) References Cited

U.S. PATENT DOCUMENTS

| | | | |
|---|---|---|---|
| 5,902,093 A | 5/1999 | Liotta et al. | |
| 6,234,754 B1* | 5/2001 | Zelesky | F01D 5/187 |
| | | | 415/115 |
| 6,915,840 B2 | 7/2005 | Devine, II et al. | |
| 6,932,571 B2 | 8/2005 | Cunha et al. | |
| 7,121,787 B2* | 10/2006 | Jacks | F01D 5/186 |
| | | | 415/115 |
| 7,270,173 B2 | 9/2007 | Wiedemer et al. | |
| 7,665,965 B1 | 2/2010 | Liang | |
| 8,096,768 B1 | 1/2012 | Liang | |
| 9,279,331 B2 | 3/2016 | Levine et al. | |
| 2005/0031451 A1* | 2/2005 | Cunha | F01D 5/187 |
| | | | 416/97 R |
| 2005/0169754 A1* | 8/2005 | Surace | F01D 5/16 |
| | | | 416/97 R |
| 2005/0265840 A1 | 12/2005 | Levine et al. | |
| 2005/0265842 A1 | 12/2005 | Levine et al. | |
| 2005/0265844 A1 | 12/2005 | Levine et al. | |
| 2006/0107668 A1* | 5/2006 | Cunha | F01D 5/18 |
| | | | 60/806 |
| 2006/0239819 A1* | 10/2006 | Albert | B22C 9/04 |
| | | | 416/97 R |
| 2007/0140848 A1 | 6/2007 | Charbonneau et al. | |
| 2007/0147997 A1 | 6/2007 | Cunha et al. | |
| 2007/0172355 A1* | 7/2007 | Cunha | F01D 5/186 |
| | | | 416/97 R |
| 2008/0131285 A1 | 6/2008 | Alberts et al. | |
| 2008/0169412 A1 | 7/2008 | Snyder et al. | |
| 2009/0285684 A1* | 11/2009 | Pinero | F01D 5/187 |
| | | | 416/92 |
| 2010/0254801 A1* | 10/2010 | Tibbott | F01D 5/186 |
| | | | 415/115 |

OTHER PUBLICATIONS

International Search Report and Written Opinion for PCT/US2013/030332. Date of Completion Dec. 13, 2013.
International Preliminary Report on Patentability for PCT Application No. PCT/US2013/030332 dated Nov. 6, 2014.

* cited by examiner

GAS TURBINE ENGINE AIRFOIL TRAILING EDGE PASSAGE AND CORE FOR MAKING SAME

This application is a United States National Phase of PCT Application No. PCT/US2013/030332 filed on Mar. 12, 2013 which claims priority to U.S. application Ser. No. 13/453,137 filed on Apr. 23, 2012.

BACKGROUND

This disclosure relates to an airfoil for a gas turbine engine. More particularly, the disclosure relates to a core and corresponding trailing edge passage for an airfoil.

Airfoils for gas turbine engines typically include rather complex internal cooling passages receiving cooling fluid from a cooling source. The passages are provided by core structures constructed from ceramic and/or refractory metal cores, which provide correspondingly shaped cooling passages within the airfoil.

One type of cooling passage includes a trailing edge cooling passage extending in a chord-wise direction from a radially extending cooling passage. The trailing edge cooling passage exits the trailing edge and can be relatively narrow. Depending upon the size of the trailing edge cooling passage, which may be as little as 0.008 inch (0.20 mm), and, as a result, the corresponding core is fragile.

As turbine inlet temperatures increase to prove engine thrust and cycle efficiency, advanced technologies are required to cool the trailing edge of turbine blades while minimizing the amount of cooling flow used. Use of refractory metal cores (RMC) to create high density patterns of cast cooling features has been shown to improve high convective heat transfer at low cooling flow requirements. However, the cores used to manufacture these features, such as a dense pattern of pedestals, are fragile and may break during assembly or casting.

SUMMARY

In one exemplary embodiment, an airfoil has a body that includes leading and trailing edges that adjoin pressure and suction sides to provide an exterior airfoil surface. A cooling passage extends in a radial direction from a root to a tip. A trailing edge cooling passage interconnects the cooling passage to the trailing edge. The trailing edge cooling passage includes first and second pedestals of different sizes that are arranged in a repeating pattern with respect to pedestals of the same size and with respect to pedestals of different sizes.

In a further embodiment of any of the above, the first pedestals have a diameter approximately twice that of the diameter of the second pedestals.

In a further embodiment of any of the above, a column of second pedestals is spaced about 1.5 diameters of the first pedestals from a column of first pedestals.

In a further embodiment of any of the above, the second pedestals are spaced about 2.5 diameters of the second pedestals from one another.

In a further embodiment of any of the above, the airfoil includes third pedestals that are of a different diameter than the first and second pedestals. The third pedestals have a diameter that is approximately two-thirds of the diameter of the first pedestal.

In a further embodiment of any of the above, the first diameter is approximately 0.030 inch (0.76 mm)

In a further embodiment of any of the above, the airfoil has a trailing edge core portion that provides first and second holes corresponding to the first and second pedestals. The trailing edge core portion is constructed from a refractory metal.

In another exemplary embodiment, a body includes leading and trailing edges that adjoin pressure suction sides to provide an exterior airfoil surface. A cooling passage extends in a radial direction from a root to a tip. A trailing edge cooling passage interconnects the cooling passage to the trailing edge. The trailing edge cooling passage has a corner region that adjoins the cooling edge passage without pedestals.

In a further embodiment of any of the above, the region without holes is within a radius of 0.075 inch.

In a further embodiment of any of the above, the corner is defined by a second radius of 0.050 inch.

In a further embodiment of any of the above, the airfoil has a trailing edge core portion that is provided by a refractory metal. The trailing edge core portion provides the trailing edge cooling passage.

In another exemplary embodiment, a core assembly for an airfoil has a ceramic core portion that includes a slot, and a trailing edge core portion received within the slot. The slot is provided by first and second lateral surfaces spaced apart from one another and interconnected by an interior surface. An end of the trailing edge core portion is received within the slot. The first lateral surface is perpendicular to the interior surface. The second lateral surface is at a non-normal angle relative to the interior surface.

In a further embodiment of any of the above, the side of the trailing edge core portion is generally parallel to the first lateral surface.

In a further embodiment of any of the above, the second lateral surface is at an angle of approximately less than 5 degrees with respect to the interior surface.

In a further embodiment of any of the above, the slot includes a width that is about 1.25 times a width of the trailing edge core portion.

In a further embodiment of any of the above, a slot is provided between first and second spaced apart exterior surfaces. The exterior surfaces have a width that is about 1.5 times the width of the trailing edge core portion.

In a further embodiment of any of the above, the slot includes a depth of at least 0.050 inch.

In a further embodiment of any of the above, the core portion includes a length beneath the slot of at least 0.050 inch.

In a further embodiment of any of the above, the trailing edge core portion is a refractory metal. The core portion is a ceramic.

In another exemplary embodiment, an airfoil includes a body. The body includes leading and trailing edges adjoining pressure and suction sides to provide an exterior airfoil surface. First and second cooling passages extend in a radial direction from a root to a tip. The first cooling passage includes a tip flag passage that is radially inboard from the tip and extends in a chord-wise direction to a first end that penetrates the trailing edge. The second cooling passage includes a second end terminates adjacent the tip flag passage and a dirt purge passage interconnects the second end to the tip flag passage.

In a further embodiment of any of the above, a trailing edge passage extends from the second cooling passage that penetrates the trailing edge.

In a further embodiment of any of the above, pedestals are arranged in the trailing edge passage and interconnect opposing pressure and suction side walls.

In a further embodiment of any of the above, the trailing edge passage has a thickness in the range of 0.008 to 0.0.020 inch (0.20 to 0.51 mm).

In a further embodiment of any of the above, the dirt purge passage includes a width in the range of 0.017 to 0.045 inch (0.43 to 1.14 mm).

In a further embodiment of any of the above, a third cooling passage is arranged between the first and second cooling passages in the chord-wise direction. The third cooling passage has a serpentine shape and terminates in a third end near the tip flag passage. A tie passage interconnects the third end to the tip flag passage.

In a further embodiment of any of the above, the tip flag passage is discrete from the trailing edge passage.

In another exemplary embodiment, a core for an airfoil includes first and second core portions that extend in a radial direction. The first core portion includes a tip flag portion extending in a chord-wise direction and has a first end configured to penetrate an airfoil trailing edge. The second core portion includes a second end terminating adjacent to the tip flag portion. A core tie interconnects the second end to the tip flag portion and is configured to provide a dirt purge passage.

In a further embodiment of any of the above, a trailing edge core portion extends from the second core portion and is configured to penetrate the airfoil trailing edge.

In a further embodiment of any of the above, multiple core portions are secured to one another and configured to correspond to multiple cooling passages. The first and second core portions are provided by a first core. The trailing edge core portion is provided by a second core secured to the first core.

In a further embodiment of any of the above, the first core is ceramic, and the second core is refractory metal core.

In a further embodiment of any of the above, the second core portion includes a slot receiving the trailing edge core portion.

In a further embodiment of any of the above, the trailing edge core portion includes multiple apertures that are configured to provide airfoil pedestals.

In a further embodiment of any of the above, the trailing edge core portion has a thickness in the range of 0.008 to 0.020 inch (0.20 to 0.51 mm).

In a further embodiment of any of the above, the core tie includes a width in the range of 0.017 to 0.045 inch (0.43 to 1.14 mm).

In a further embodiment of any of the above, a third core portion is arranged between the first and second core portions in the chord-wise direction. The third core portion has a serpentine shape and terminates in a third end near the tip flag portion. A second core tie interconnects the third end to the tip flag portion.

In a further embodiment of any of the above, an inlet core portion is arranged opposite the tip flag portion and interconnects the first, second and third core portions to one another.

In a further embodiment of any of the above, the core includes the core tie. The second core portion and the tip flag portion are integral with one another and constructed of the same material.

BRIEF DESCRIPTION OF THE DRAWINGS

The disclosure can be further understood by reference to the following detailed description when considered in connection with the accompanying drawings wherein.

DETAILED DESCRIPTION

Figure 1:
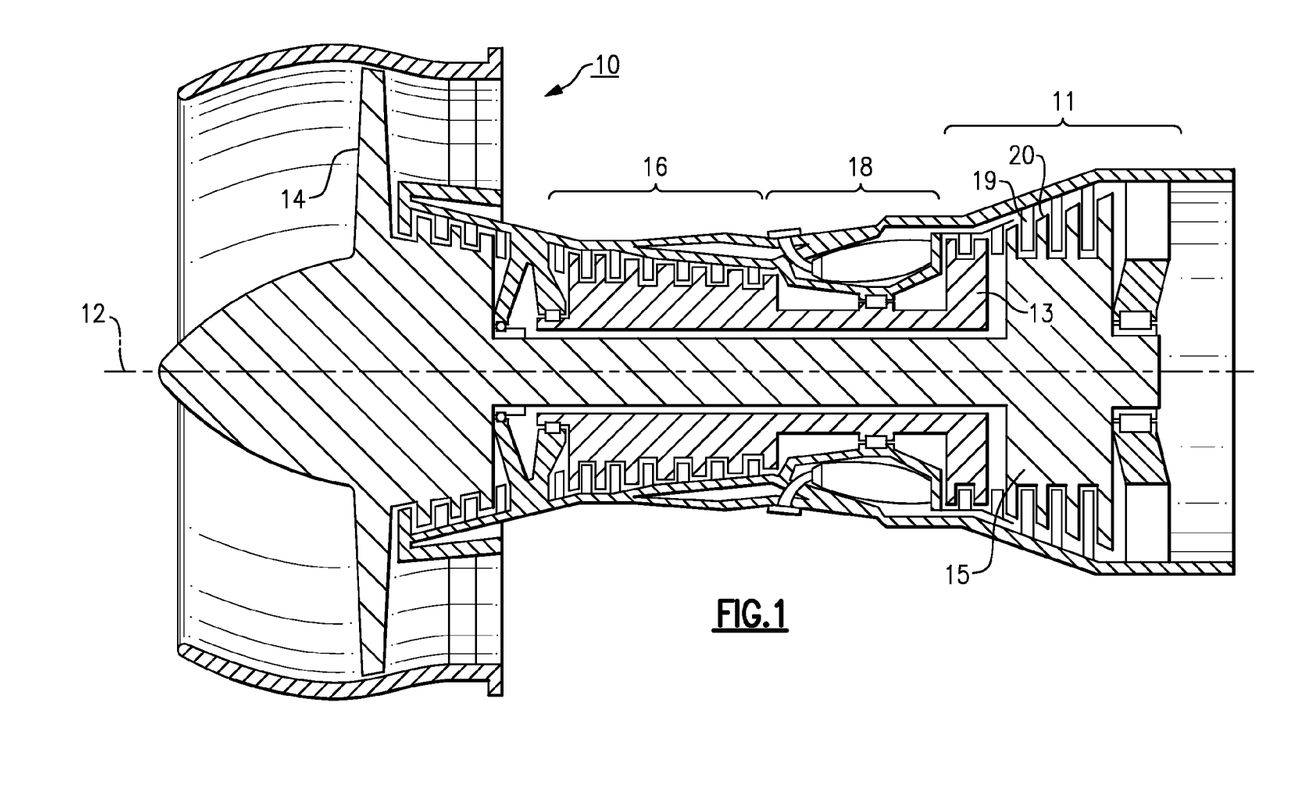
FIG. 1 is a schematic view of an example gas turbine engine incorporating the disclosed airfoil.

FIG. 1 schematically illustrates a gas turbine engine 10 that includes a fan 14, a compressor section 16, a combustion section 18 and a turbine section 11, which are disposed about a central axis 12. As known in the art, air compressed in the compressor section 16 is mixed with fuel that is burned in combustion section 18 and expanded in the turbine section 11. The turbine section 11 includes, for example, rotors 13 and 15 that, in response to expansion of the burned fuel, rotate, which drives the compressor section 16 and fan 14.

The turbine section 11 includes alternating rows of blades 20 and static airfoils or vanes 19. It should be understood that FIG. 1 is for illustrative purposes only and is in no way intended as a limitation on this disclosure or its application.

Figure 2A:
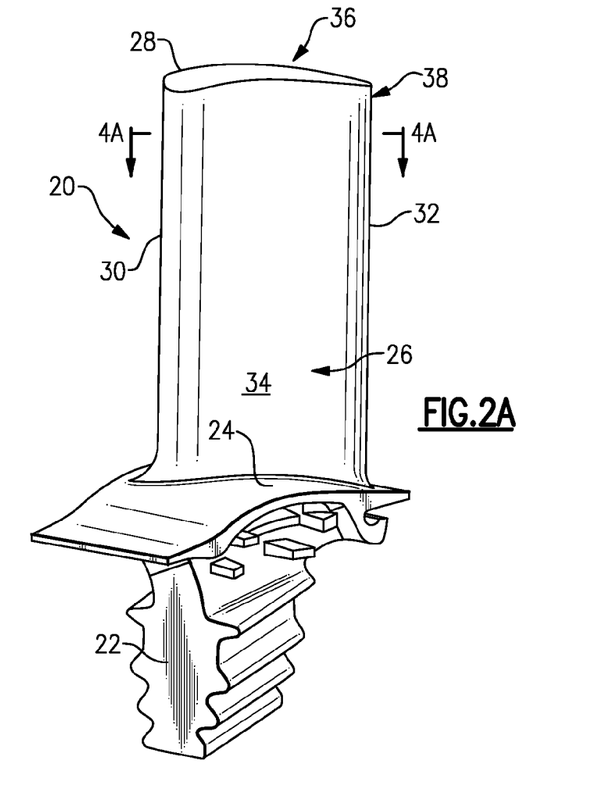
FIG. 2A is a perspective view of the airfoil having the disclosed cooling passage.

An example blade 20 is shown in FIG. 2A. The blade 20 includes a platform 24 supported by a root 22, which is secured to a rotor, for example. An airfoil 26 extends radially outwardly from the platform 24 opposite the root 22 to a tip 28. While the airfoil 26 is disclosed as being part of a turbine blade 20, it should be understood that the disclosed airfoil can also be used as a vane.

Figure 2B:
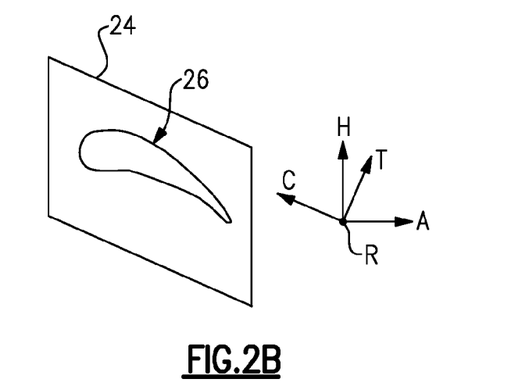
FIG. 2B is an end view of the airfoil illustrating directional references.

Referring to FIG. 2B, the airfoil 26 includes an exterior airfoil surface 38 extending in a chord-wise direction C from a leading edge 30 to a trailing edge 32. The airfoil 26 is provided between pressure and suction sides 34, 36 in an airfoil thickness direction T, which is generally perpendicular to the chord-wise direction C. Multiple airfoils 26 are arranged circumferentially in a circumferential direction H. The airfoil 26 extends from the platform 24 in a radial direction R to the tip 28. The exterior airfoil surface 38 may include multiple film cooling holes.

Figure 3A:
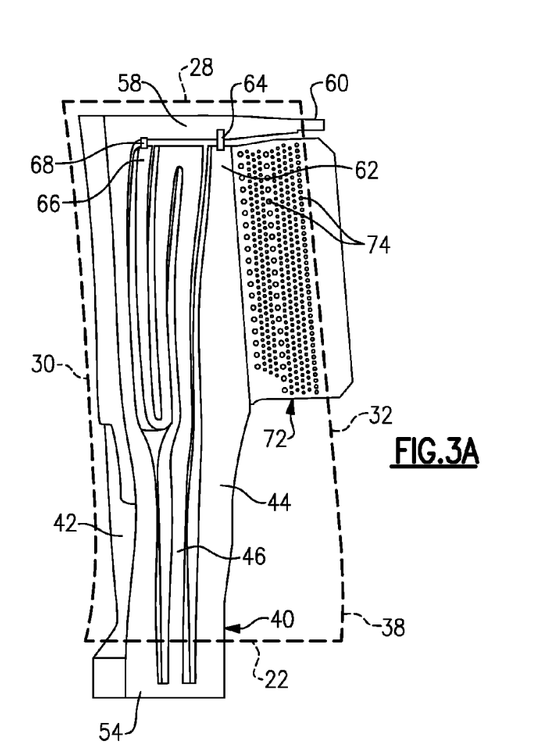
FIG. 3A is a perspective view of an example core providing a core tie corresponding to a dirt purge passage, with an exterior airfoil surface shown in phantom.

An example core for making the airfoil 26 is illustrated in FIG. 3A. The core may be a single, unitary core or include multiple core portions secured to one another. The shapes of the core portions correspond to shapes of internal cooling passages of the airfoil 26. In the example shown, the core is provided by a first core 40 constructed from ceramic and a second core 72 constructed from a refractory metal.

The first core 40 includes first, second and third core portions 42, 44, 46, which all extend generally in the radial direction. An inlet core portion 54 interconnects the first, second and third core portions 42, 44, 46 at the root 22. In the example, the first core portion 42 is located near the leading edge 30 of the airfoil 26. The first core portion 42 extends in the chord-wise direction to provide a tip flag portion 58 adjacent to the tip 28. The tip flag portion 58 terminates in a first end 60 that is configured to extend beyond the trailing edge 32 of the airfoil 26 for casting purposes, which will be discussed in more detail relative to FIG. 3B.

With continuing reference to FIG. 3A, the second core portion 44 terminates in a second end 62 adjacent to and radially beneath the tip flag portion 58. A first core tie 64 interconnects the second end 62 to the tip flag portion 58. The first core tie 64 provides stability of the second end 62 relative to the tip flag portion 58 as well as provides a corresponding dirt purge feature (or passage) for the airfoil 26.

In the example, the first and second core portions 42, 44 provide a single radial run. The third core portion 46 is arranged between the first and second core portions 42, 44 in the chord-wise direction. The third core portion 46 has a serpentine shape providing multiple radial runs and terminates in a third end 66 near the tip flag portion 58. A second core tie 68 interconnects the third end 66 to the tip flag portion 58.

Figure 3B:
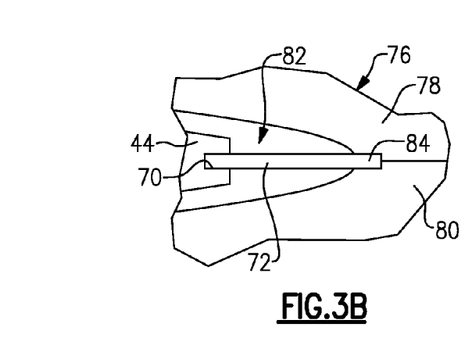
FIG. 3B is a partial cross-sectional view of the core shown in a wax mold.

Referring to FIGS. 3A and 3B, the second core portion 44 includes a slot 70 for receiving the trailing edge core portion 72. The trailing edge core portion 72 includes multiple apertures 74, which provide correspondingly shaped pedestals 88, discussed below relative to FIGS. 4A and 4B. The trailing edge core portion 72 is designed to extend beyond the exterior airfoil surface 38 (FIG. 3A) such that the trailing edge core portion 72 provides a core edge 84 that is received and held between first and second mold portions 78, 80 of a mold 76. The first and second mold portions 78, 80 provide a mold cavity 82 that receives wax that provides a shape of the airfoil 26.

Figure 3C:
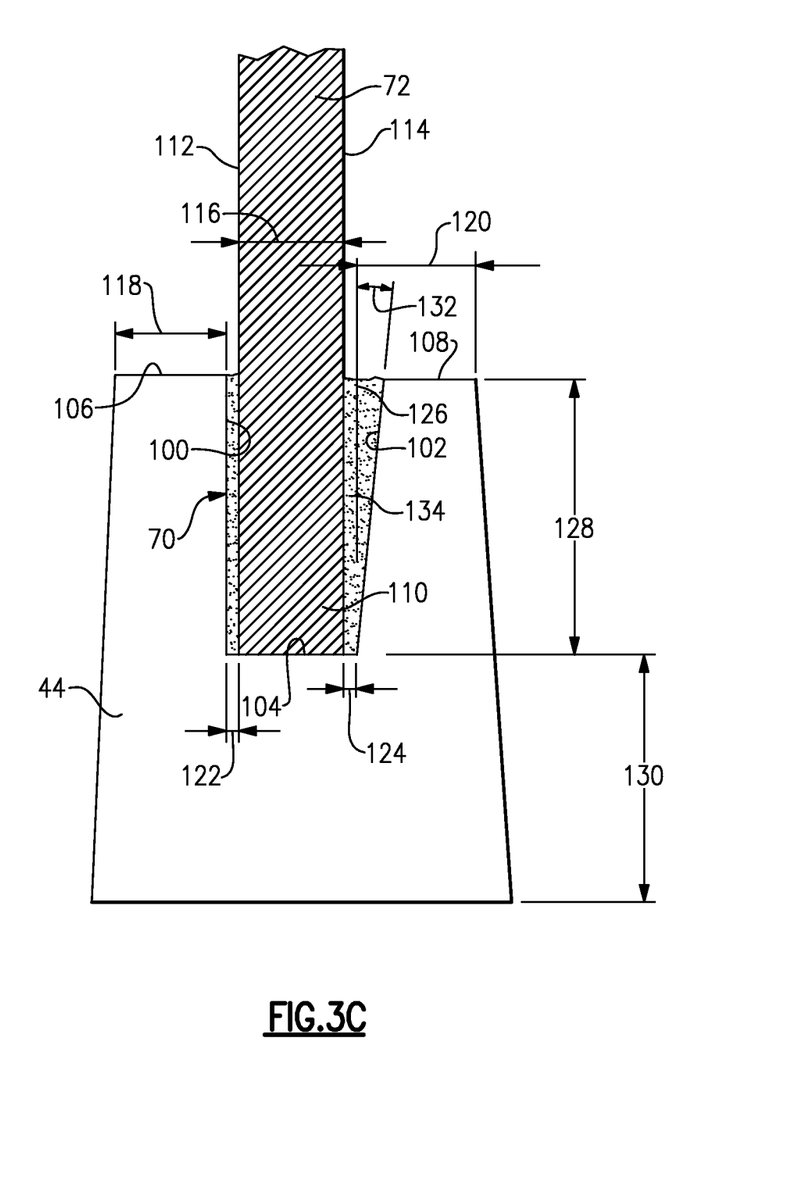
FIG. 3C is a cross-sectional view of a second core portion and trailing edge core portion for producing a trailing edge cooling passage.

The second core portion 44 and trailing edge core portion 72 interface is shown in more detail in FIG. 3C. The slot 70 is provided by first and second lateral surfaces 100, 102 that are connected by an interior surface 104. In the example, the first lateral surface 100 is at a right angle to the interior surface 104. The second lateral surface 102 is at an angle 132 relative to a plane 126 that is normal to the interior surface 104. In the example, the angle 132 is less than 5 degrees, and in one example, about 3 degrees.

During assembly, the slot 70 is filled with an adhesive material 134. An end 110 of the trailing edge core portion 72 is inserted into the slot 70 and abuts the interior surface 104. The first lateral surface 100 is used to align the trailing edge core portion 72 with respect to the second core portion 44 such that a first side 112 is generally parallel to the first lateral surface 100. The angled second lateral surface 102 provides relief with respect to a second side 114 of the trailing edge core portion 72 to facilitate insertion of the end 110 and accommodate the adhesive material 134 as the end 110 is seated within the slot 70.

Since the second core portion 44 is constructed from a ceramic material, which is brittle, the structure may fracture during assembly or casting. The trailing edge core portion 72 includes a core width 116 between the first and second sides 112, 114. The second core portion 44 includes first and second outer lateral surfaces 118, 120 that respectively adjoin the first and second exterior surfaces 106, 108. The first exterior surface 106 includes a first width 118 that is approximately 1.5 times the core width 116. A second width 120 is provided between the plane 126 and along the second exterior surface 108. The second width 120 is approximately 1.5 times the core width 116.

The slot 70 has first and second gap widths 122, 124, which are approximately one-quarter the core width 116. The slot 70 extends a depth 128 that is at least approximately 0.050 inch (1.27 mm). The second core portion 44 has a length 130 of structure beneath the slot 70 that is at least 0.050 inch (1.27 mm).

Figure 3D:
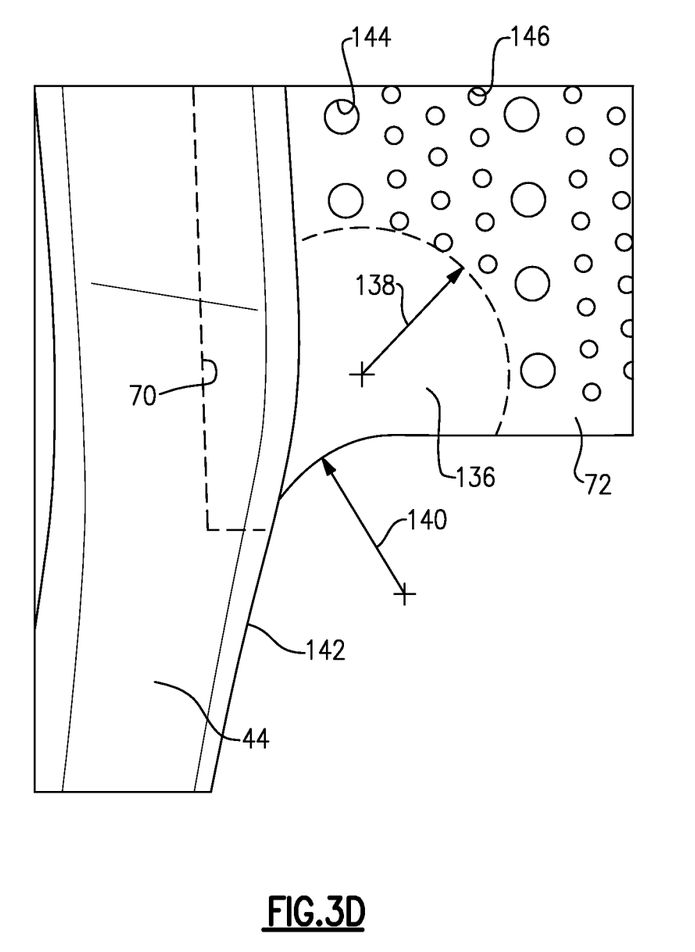
FIG. 3D is an enlarged view of a first end portion of the second core portion and trailing edge core portion.

Referring to FIG. 3D, the trailing edge core portion 72 includes a region 136 with a first radius 138 that is without holes to provide additional strength at an edge 142 of the trailing edge core portion 72 where the trailing edge core portion 72 is received within the slot 70. Additionally, the corner of the trailing edge core portion 72 includes a second radius 140 that is roughly tangential to an edge 142 of the second core portion 44. In one example, the first radius 138 is at least 0.075 inch (1.91 mm), and the second radius 140 is at least 0.050 inch (1.27 mm).

Figure 4A:
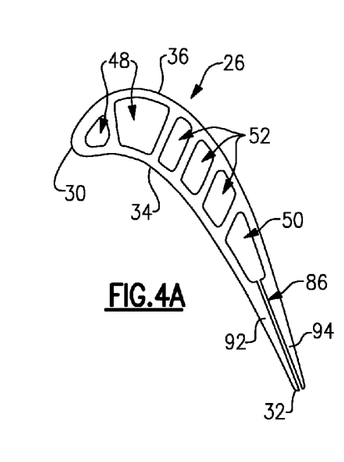
FIG. 4A is a cross-sectional view through the airfoil taken along line 4A-4A in FIG. 2A.
Figure 4B:
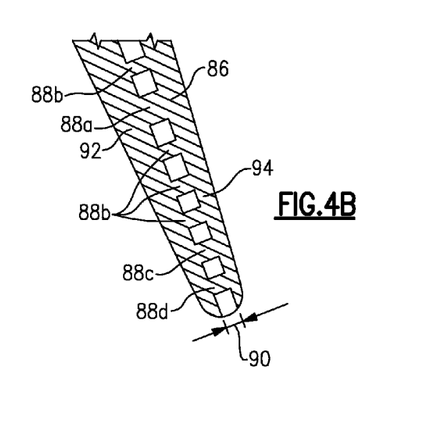
FIG. 4B is an enlarged view of a portion of the airfoil illustrated in FIG. 4A.
Figure 5:
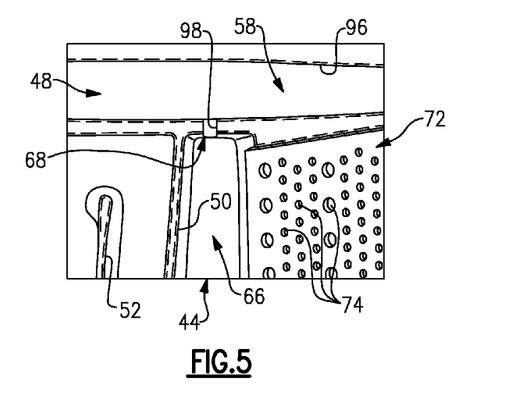
FIG. 5 is an enlarged view of the second end portion of the core illustrated in FIG. 3A with the corresponding airfoil cooling passages shown in phantom.

Referring to FIGS. 4A and 4B and FIG. 5, the airfoil 26 includes first, second and third cooling passages 48, 50, 52 that respectively correspond to the shape of the first, second and third core portions 42, 44, 46. A trailing edge cooling passage 86 is provided in the airfoil 26 that corresponds to the shape of the trailing edge core portion 72. As shown in FIG. 4B, the apertures 74 provided in the trailing edge core portion 72 produce pedestals 88a, 88b, 88c, 88d that interconnect pressure and suction side walls 92, 94 providing desired cooling characteristics along the trailing edge 32 of the airfoil 26. The trailing edge cooling passage 86 has a thickness 90 in the range of 0.008 to 0.020 inch (0.20 to 0.51 mm).

Referring to FIG. 5, the second core portion 44 terminates in the third end 66, as previously described, to provide the second cooling passage 50. Typically, the dirt accumulating in the second cooling passage 50 would be forced to exit the trailing edge cooling passage 86, which is relatively narrow and obstructed by pedestals 88 (FIG. 4B). With the second core tie 68 interconnecting the second core portion 44 and the tip flag portion 58, a dirt purge feature or passage 98 is provided, which permits the dirt in the second cooling passage 50 to instead exit through the tip flag passage 96 rather than the trailing edge cooling passage 86. As such, the tip flag passage 96 is otherwise discrete from the trailing edge cooling passage 86.

Figure 6:
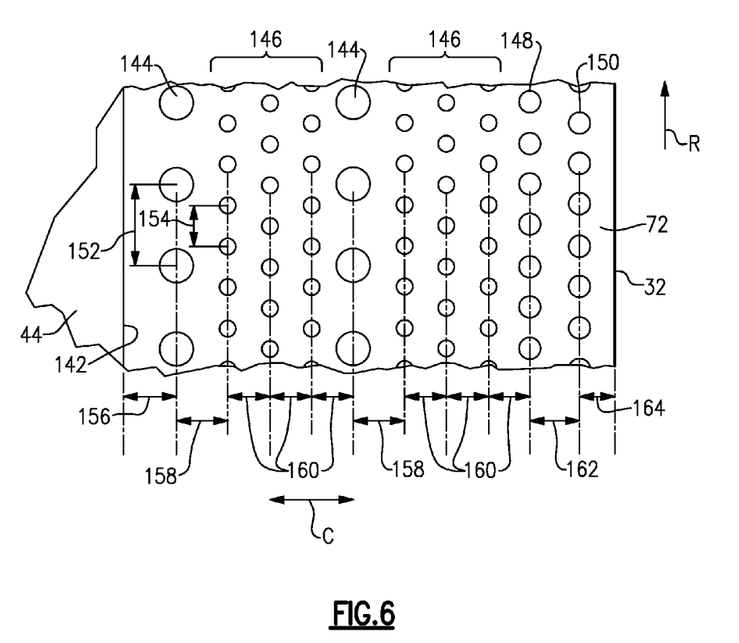
FIG. 6 is an enlarged view of a portion of the trailing edge core portion.

Referring to FIG. 6, the trailing edge core portion 72 is illustrated with one example repeating hole pattern, which enables low cost stamping while minimizing pressure loss upstream of the trailing edge in the finished airfoil. The pedestals are arranged in a repeating pattern with respect to pedestals of the same size and with respect to pedestals of different sizes. The trailing edge core portion 72 is constructed from a refractory metal and is relatively flat from the inner platform to the tip with very little aerodynamic twist.

In the example, first, second, third and fourth holes 144, 146, 148, 150 are arranged within a repeating pattern with respect to a given hole size and amongst adjacent holes of differing sizes. In one example, the first holes 144 have a first spacing 152 in the radial direction R, and the second holes 146 have a second spacing 154 in the radial direction R. The first spacing 152 is approximately twice that of the second spacing 154. In one example, the first holes 144 are approximately twice the diameter of the second holes 146.

The column of first holes 144 is adjacent to the edge 142 of the second core portion 44 at a third spacing 156 that is approximately 1.1 times the diameter of the first holes 144. The first holes 144 are spaced from the first row of second holes 146 a fourth spacing 158 that is 1.5 times the diameter of the first holes 144. The columns of second holes 146 are spaced apart from one another 2.5 times the diameter of the second holes 146, as indicated by a fifth spacing 160. The column of third holes 148 are spaced a sixth spacing 162 that is 2.5 times the diameter of the third holes 148, and the fourth holes 150 are spaced a seventh spacing 164 that is 1.5 times the diameter of the fourth holes from the trailing edge 32. The third, fourth, fifth, sixth and seventh spacings 156, 158, 160, 162, 164 are in the chordwise direction C.

The fourth holes 150 are of a slightly larger diameter than the third holes 148. The third and fourth holes are approximately two-thirds the diameter of the first hole 144. In one example, the diameter of the first hole 144 is about 0.030 inch (0.76 mm).

Referring to FIG. 4B, multiple pedestals having different diameters are illustrated. The first pedestal 88a corresponds to the first hole 144, the second pedestal 88b corresponds to the second hole 146, the third pedestal 88c corresponds to the third hole 148, and the fourth pedestal 88d corresponds to the fourth hole 150.

Although example embodiments have been disclosed, a worker of ordinary skill in this art would recognize that certain modifications would come within the scope of the claims. For that reason, the following claims should be studied to determine their true scope and content.

What is claimed is:

1. An airfoil comprising:
a body including leading and trailing edges adjoining pressure and suction sides to provide an exterior airfoil surface, a cooling passage extending in a radial direction from a root to a tip, and a trailing edge cooling passage interconnecting the cooling passage to the trailing edge, the trailing edge cooling passage including radial columns comprising first and second pedestals of different diameters and arranged in a repeating pattern with respect to pedestals of the same size and with respect to pedestals of different diameters, wherein one of the first and second pedestals is nearer to the trailing edge than the other of the first and second pedestals, the one of the first and second pedestals are larger than the other of the first and second pedestals, wherein the second pedestals are arranged in columns spaced apart from one another in a chord-wise direction, and a center of the columns are spaced 2.5 diameters of the second pedestals from one another, and including third pedestals that are of a different diameter than the first and second pedestals.

2. The airfoil according to claim 1, wherein the first pedestals have a diameter twice that of the diameter of the second pedestals.

3. The airfoil according to claim 1, wherein one of the columns of second pedestals is spaced 1.5 diameters of the first pedestals from a column of first pedestals.

4. The airfoil according to claim 1, wherein the third pedestals have a diameter that is two-thirds of the diameter of the first pedestal.

5. The airfoil according to claim 1, wherein the first pedestal has a diameter that is 0.030 inch (0.76 mm).

6. The airfoil according to claim 1, comprising a trailing edge core portion providing first and second holes corresponding to the first and second pedestals, the trailing edge core portion constructed from a refractory metal.

7. The airfoil according to claim 1, wherein the trailing edge cooling passage has a corner region without pedestals.

8. The airfoil according to claim 7, wherein the corner region without pedestals is within a radius of 0.075 in (1.91 mm).

9. The airfoil according to claim 8, wherein the corner region is defined by a second radius of 0.050 inch (1.27 mm).

* * * * *